United States Patent
Halsall

(10) Patent No.: US 9,931,254 B2
(45) Date of Patent: Apr. 3, 2018

(54) POWERED MOBILITY DEVICE WITH TILT MECHANISM HAVING MULTIPLE PIVOTS

(71) Applicant: Kevin Thomas Halsall, Otaki (NZ)

(72) Inventor: Kevin Thomas Halsall, Otaki (NZ)

(73) Assignee: OGO TECHNOLOGY LIMITED, Otaki (NZ)

( * ) Notice: Subject to any disclaimer, the term of this patent is extended or adjusted under 35 U.S.C. 154(b) by 6 days.

(21) Appl. No.: 15/079,033

(22) Filed: Mar. 23, 2016

(65) Prior Publication Data

US 2016/0302981 A1 Oct. 20, 2016

Related U.S. Application Data

(63) Continuation-in-part of application No. 14/373,354, filed as application No. PCT/NZ2013/000010 on Feb. 8, 2013, now Pat. No. 9,585,801.

(30) Foreign Application Priority Data

Apr. 10, 2015 (NZ) ........................................ 706881

(51) Int. Cl.
*A61G 5/04* (2013.01)
*A61G 5/10* (2006.01)
*A61G 5/12* (2006.01)
*B62K 11/00* (2006.01)

(52) U.S. Cl.
CPC ........... *A61G 5/041* (2013.01); *A61G 5/1051* (2016.11); *A61G 5/1056* (2013.01); *A61G 5/1062* (2013.01); *A61G 5/1089* (2016.11); *A61G 5/128* (2016.11); *B62K 11/007* (2016.11); *A61G 2203/14* (2013.01); *A61G 2203/44* (2013.01)

(58) Field of Classification Search
CPC ............ A61G 2203/44; A61G 2203/36; B62K 11/007; B60K 26/00; B60K 2026/025
USPC ......................................... 180/6.6, 316, 907
See application file for complete search history.

(56) References Cited

U.S. PATENT DOCUMENTS

| | | | |
|---|---|---|---|
| 6,062,600 A * | 5/2000 | Kamen | A61G 5/04 280/250.1 |
| 2009/0000850 A1* | 1/2009 | Hornick | A61G 5/043 180/316 |
| 2010/0070132 A1* | 3/2010 | Doi | B60L 15/20 701/36 |

(Continued)

*Primary Examiner* — Tony H Winner
(74) *Attorney, Agent, or Firm* — Inventa Capital PLC

(57) ABSTRACT

A powered wheelchair 100 with a tilt mechanism having multiple pivots that allows the wheelchair 100 to be driven and steered with or without the use of hands. The wheelchair 100 has two spaced apart drive wheels 101, each mounted to a separate shaft 104 that is independent of the other drive wheel. A drive controller drivingly coupled to the shafts 104 and the drive controller is housed within a base 102 that is pivotally situated on the shafts 104. A seat 103 mounted on a tilt mechanism enables the seat to tilt in a forward, backward, left and right direction as a result of the user displacing their body weight in either of those directions. The tilt mechanism includes three pivots, a primary pivot P1, secondary pivot P2 and tertiary pivot P3. The primary pivot P1 pivotally connects the base 102 to the shafts 104. The secondary pivot P2 is situated above and adjacent the base 102 so that the respective ends of the rod 105 are pivotally connected to the base 102.

15 Claims, 5 Drawing Sheets

(56) References Cited

U.S. PATENT DOCUMENTS

| | | | | |
|---|---|---|---|---|
| 2010/0071984 A1* | 3/2010 | Doi | ................... | B62K 11/007 180/218 |
| 2011/0010066 A1* | 1/2011 | Fuwa | ................... | B62K 11/007 701/70 |
| 2011/0067939 A1* | 3/2011 | Takenaka | ............. | B62K 11/007 180/21 |

\* cited by examiner

POWERED MOBILITY DEVICE WITH TILT MECHANISM HAVING MULTIPLE PIVOTS

RELATED APPLICATIONS

This application is a continuation in part application which claims priority to U.S. non-provisional application Ser. No. 14/373,354 filed on Jul. 19, 2014 and New Zealand patent application number 706881, filed on Apr. 10, 2015 and incorporated herewith by reference in its entirety.

FIELD OF THE INVENTION

The invention relates to a powered mobility device with tilt mechanism having multiple pivots, typically a powered wheelchair, which is able to be steered with or without the use of hands.

BACKGROUND OF INVENTION

A problem with existing mobility devices such as wheelchairs is that they are not easily operable by a user, especially those users that have significant loss or impaired movement of their limbs (arms and legs).

Also most all wheelchairs are not suitable to be used on all surface types. They are not able to be used easily or effectively on soft surfaces such as lawns or undulating surfaces, i.e. they are not able to be used "off road". They are prone to get stuck and require assistance of others to be able to go "off road".

Powered wheelchairs typically require hand controls to steer and propel the wheel chair forward and backward and/or only one pivoting mechanism for controlling the forward and backward movement of the wheelchair. It is known to have wheel chairs that are controlled by the weight placement of the user, however these are not suitable for providing fine control of such movement in places where required (such as a crowded place or in a shop) or are not suitable for "off road" use.

All references, including any patents or patent applications cited in this specification such as U.S. Pat. No. 9,585,801 B2 to Halsall dated Mar. 7, 2017 are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the invention to provide a powered mobility device with tilt mechanism having multiple pivots, typically a powered wheelchair, that ameliorates some of the disadvantages and limitations of the known art or at least provide the public with a useful choice.

SUMMARY OF INVENTION

In a first aspect the invention resides in a powered mobility device with a tilt mechanism having multiple pivots, typically a powered wheelchair, which is able to be driven and steered with or without the use of hands, wherein the powered mobility device includes:

i. at least two drive wheels where each drive wheel is mounted on a separate drive shaft such that the each drive wheel can be independently driven;

ii. a drive controller drivingly coupled to the shafts;

iii. a seat mounted on a tilt mechanism enabling the seat to tilt in a forward, backward, left and right direction as a result of the user displacing their body weight in either of those directions; and iii. a weight displacement sensor connected to the tilt mechanism and the drive controller such that upon sensing a weight displacement of a user in a particular direction the weight displacement sensor causes the drive controller to impart drive to one or both of the drive wheels to move the mobility device in the direction of the sensed displaced weight of the user and enable the mobility device to be driven in a forward or backward direction and/or steered in a left or right direction;

the mobility device being further characterized in that the tilt mechanism includes a primary and a secondary pivot, where the primary pivot is mounted on the shafts to allow the tilt mechanism to tilt the seat in a backwards or forwards direction, and the secondary pivot is spaced a distance above the primary pivot so that the secondary pivot is situated between the seat and the shafts such that the secondary pivot allows the seat to tilt backwards or forwards about the secondary pivot to enhance the offset of weight transfer to allow increased control of the backwards or forwards of the seat relative to the shafts.

Preferably, the mobility device includes a tilt locker adapted to lock the tilt mechanism to disable the seat from being tilted.

Preferably, the mobility device includes a hand controller selectively engageable with the tilt mechanism and the weight displacement sensor such that the hand controller is adapted to disengage left and right movement of the tilt mechanism so that the hand controller when moved left or right causes the weight displacement sensor to enable the drive controller to steer the mobility device in a desired direction.

Preferably, the tilt mechanism has a tertiary pivot situated between the secondary pivot and the seat, the tertiary pivot enables the tilt mechanism to tilt the seat in a left or right direction to allow the mobility device to turn left or right.

Preferably, the tertiary pivot is connected to the secondary pivot by at least one rod that extends upwardly from the secondary pivot towards the seat.

Preferably, the primary pivot includes a base unit pivotally situated on the shafts, wherein the base unit houses at least the drive controller.

Preferably, the secondary pivot is situated above and adjacent the base unit so as to pivotally connect a respective end of the rod to the base unit.

Preferably, the tilt mechanism includes one or more adjustable springs to balance and compensate for people of different weights, characterized in that the adjustable spring(s) is/are attached at one end to an upper point/part of the tilt mechanism and is attached at the other end to a fixed point/part on the powered mobility device.

Preferably, the powered mobility device includes a hydraulic system to control and regulate the movement of the seat, characterized in that the hydraulic system includes an hydraulic ram or rams, an hydraulic line or lines and one or more hydraulic flow valve(s), the hydraulic ram or rams is/are connected between the seat and the base unit.

Preferably, the powered mobility device has a line locker is connected to the hydraulic system, and the line locker when activated locks the hydraulic system to disable the seat from moving sideways.

Preferably, the mobility device has two wheels.

Preferably, the weight displacement sensor upon sensing weight displacement in a forward direction causes the drive controller to impart drive to the wheels to move the mobility device in a forward direction.

Preferably, the weight displacement sensor upon sensing weight displacement in a backward direction causes the drive controller to impart drive to the wheels to move the mobility device in a backward direction.

Preferably, the speed of the mobility device is controlled by the forward or backward movement of the seat by the user such that the greater rate of displaced weight in the forward or backward movement of the seat is sensed by the weight displacement sensor and causes the drive controller to increase the drive output to the wheels and thus increase the speed of the mobility device.

Preferably, the degree of turn of the mobility device is controlled by the degree of left or right movement of the user such that the greater the extent of the left or right movement sensed by the weight displacement sensor causes the drive controller to impart a tighter left or right turn of the mobility device. Any other aspects herein described

BRIEF DESCRIPTION OF DRAWINGS

The invention will now be described, by way of example only, by reference to the accompanying drawings.

DESCRIPTION OF THE PREFERRED EMBODIMENT(S)

The following description will describe the invention in relation to preferred embodiments of the invention, typically a powered wheelchair, that is able to be steered with or without the use of hands The invention is in no way limited to these preferred embodiments as they are purely to exemplify the invention only and that possible variations and modifications would be readily apparent without departing from the scope of the invention.

Figure 1:
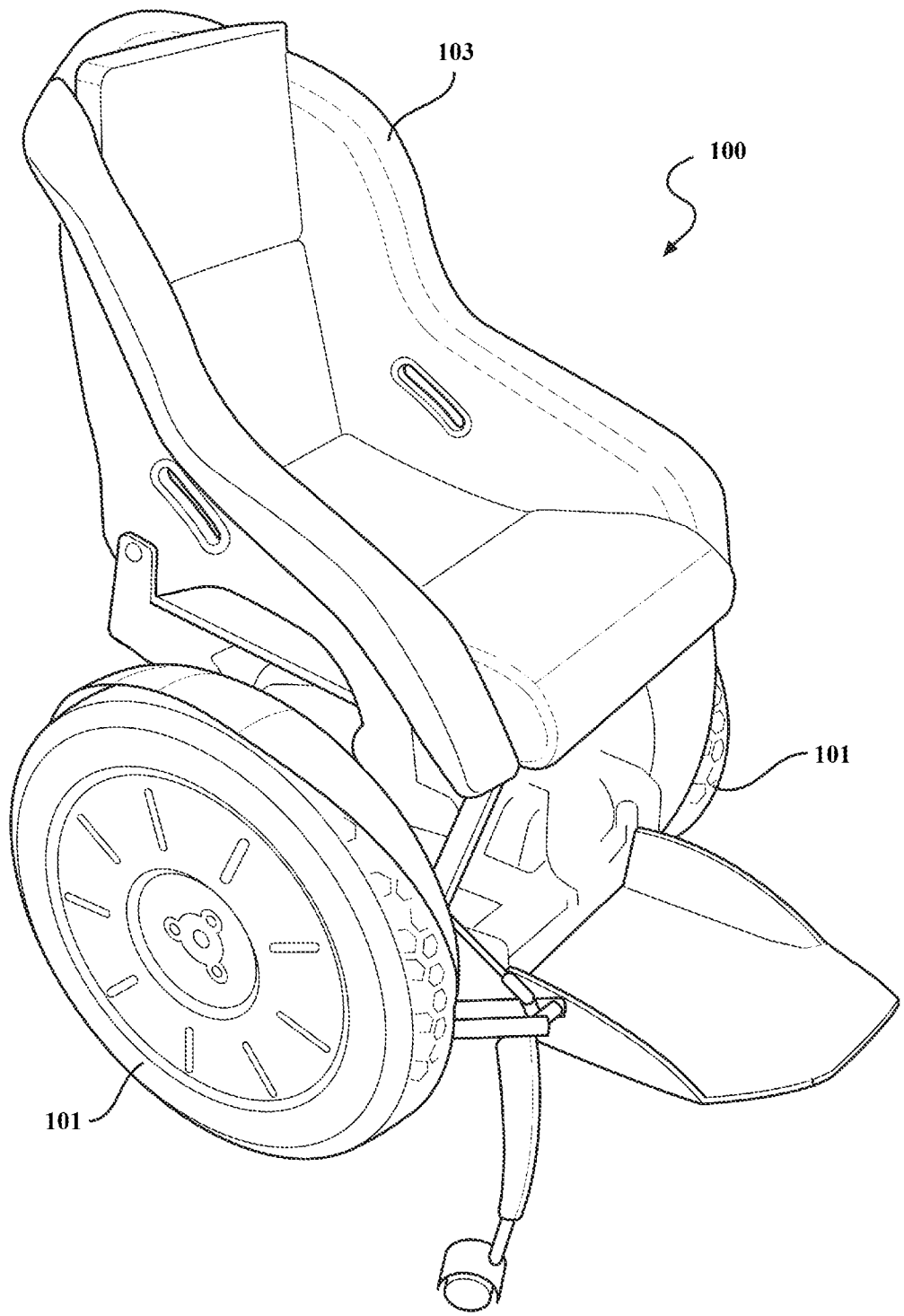
FIG. 1 is a front side perspective view of a powered mobility device in accordance with a preferred embodiment of the invention.
Figure 2:
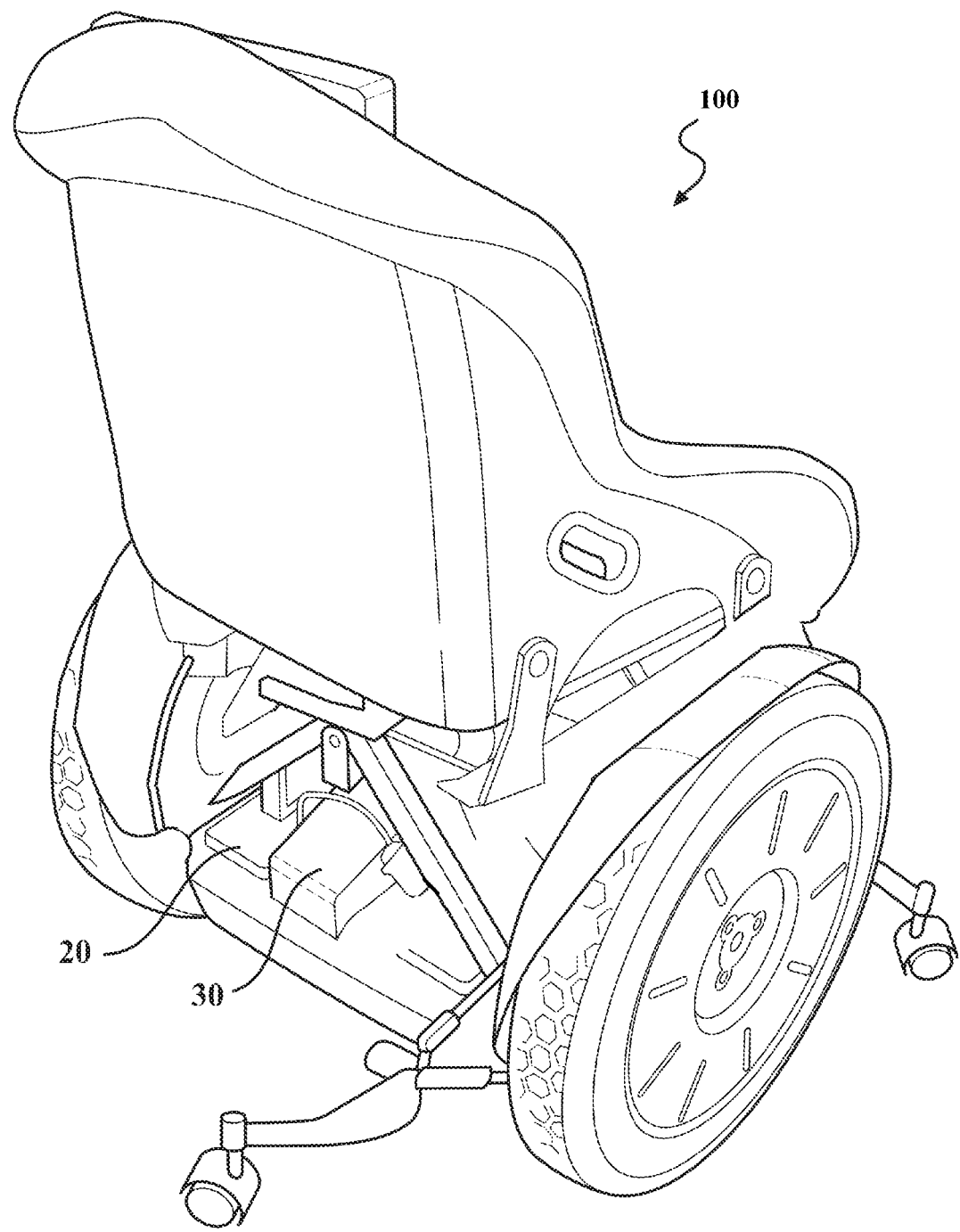
FIG. 2 is a back side perspective view of the powered mobility device as shown in FIG. 1.
Figure 3:
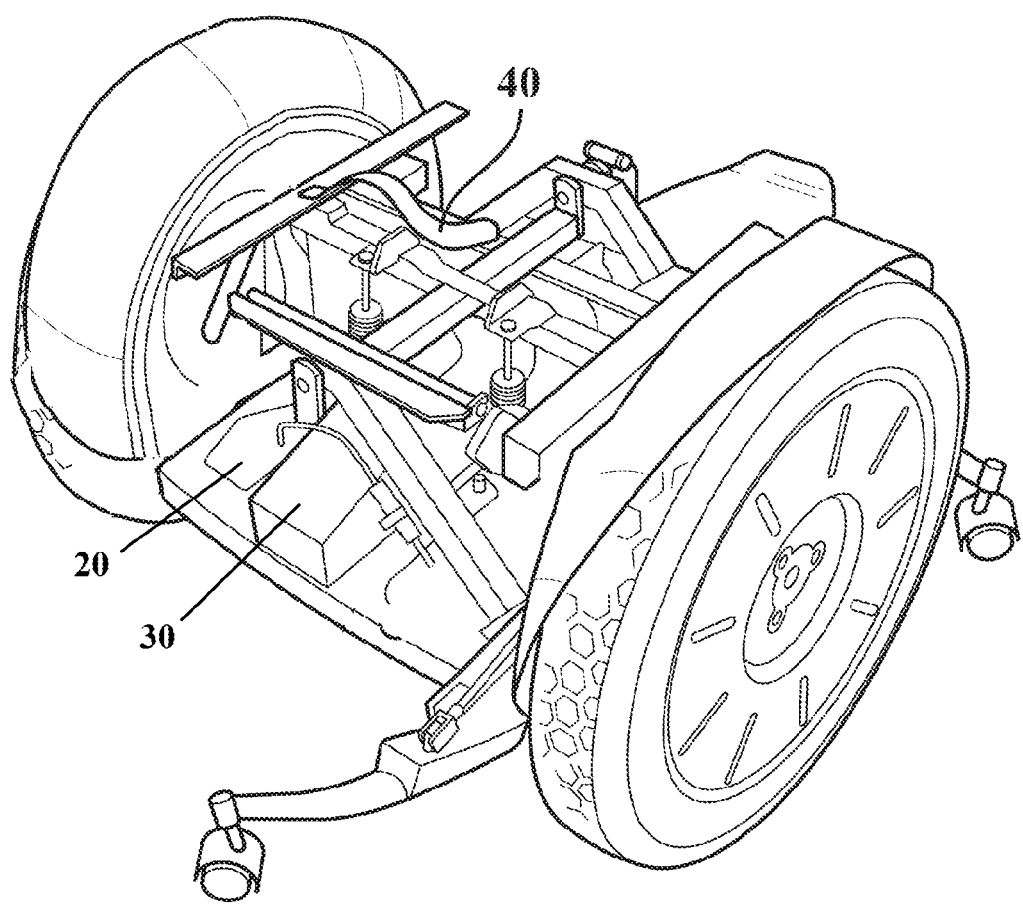
FIG. 3 is a back side perspective view of the powered mobility device (with the seat removed) as shown in FIG. 1.
Figure 4:
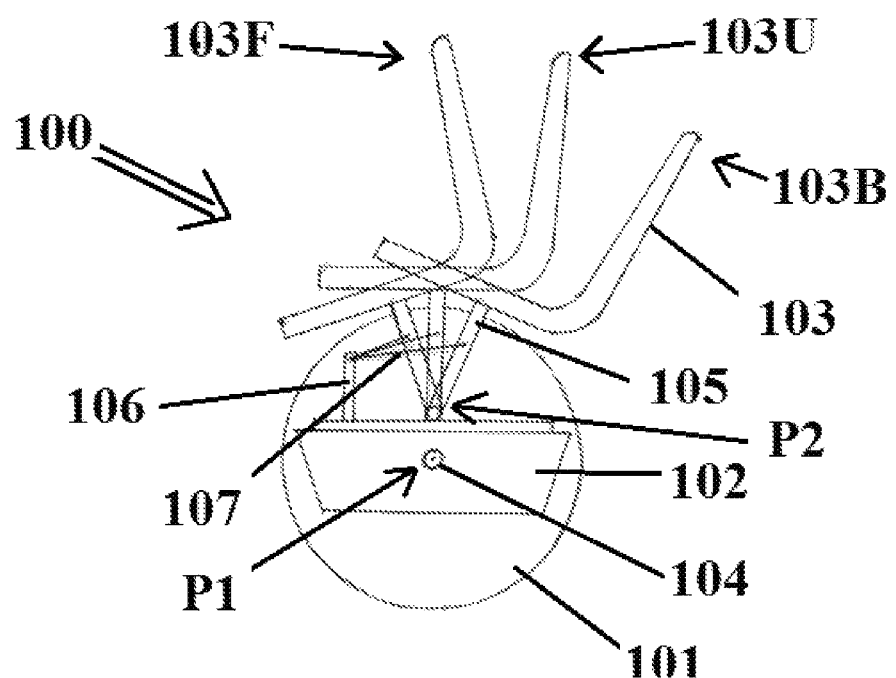
FIG. 4 is a side cutaway side view of a powered mobility device a preferred embodiment of the invention.
Figure 5:
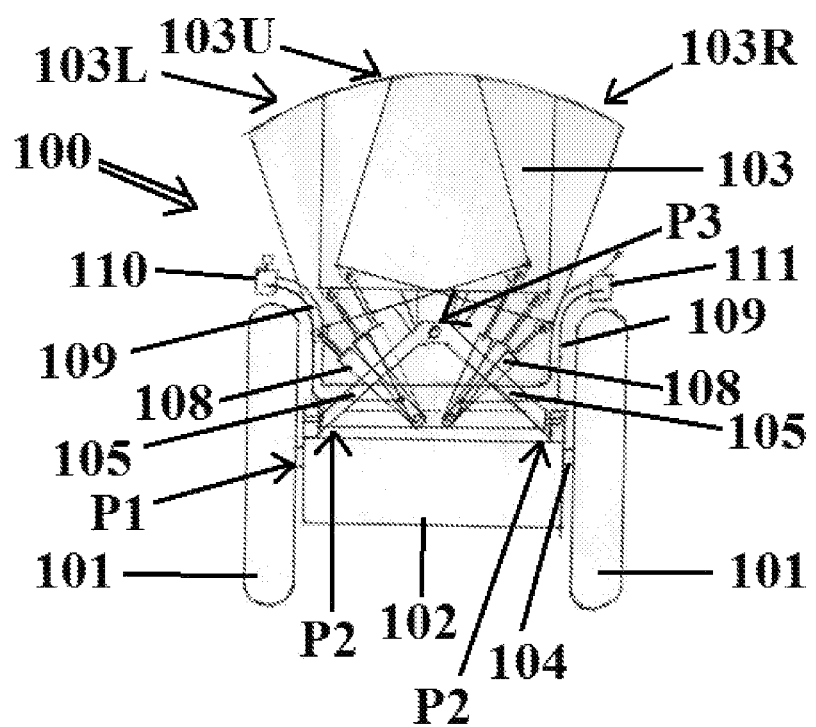
FIG. 5 is a back view of the powered mobility device with multiple pivot drive control mechanism as shown in FIG. 4.

The mobility device shown in the FIGS. 1 to 5 is to a preferred embodiment of a wheelchair. FIGS. 1 to 3 show differing views of the wheelchair 100 and FIGS. 4 & 5 show the details of the multi pivot arrangement for the wheelchair 100. The wheelchair 100 is a powered wheelchair 100 and is typically powered by electric battery, however other known modes of powering the wheelchair 100 are envisaged.

The wheelchair 100 is able to be driven on road and off-road. The wheelchair 100 is able to be maneuvered and steered with or without the use of hands. The movement and steering of the wheelchair 100 is able to be undertaken by weight displacement of the user within the seat 103 of the wheelchair 100 without using their hands.

The wheelchair 100 has two wheels 101 each mounted to separate independently driven shafts 104. The driven shafts 104 are drivingly connected to a drive motor via a drive transmission. The drive motor is controlled by a drive controller 20. The drive controller 20 is connected to a weight displacement sensing unit 30. The weight displacement sensing unit 30 is connected to a seat tilt mechanism 40. The seat 103 is detachable to the seat tilt mechanism 40.

The seat 103 is mounted to the tilt mechanism 40 so that the seat 103 can be tilted in a forward, direction in order to cause the wheelchair 100 to move forward and can be tilted in a backward direction to move the wheelchair 100 in a reverse direction. The seat 103 is tilted under the action of the user displacing their weight in particular direction they desire the wheelchair to move. The further the weight displacement the faster the wheelchair will move. Tilting of the seat to the left or to the right enables the wheelchair to be steered e.g. shifting of the users weight to the left would cause the wheelchair 10 to be steered to the left.

The wheelchair 103 can include variable tilt lock mechanism to enable the tilt mechanism to be locked so that the seat is unable to be tilted in the left and right directions, however forward and backward movement of the seat is still actionable.

The weight displacement sensing unit 30 upon sensing weight displacement of a user in a forward direction causes the drive controller 20 to impart drive to the wheels such that the wheelchair 100 moves in a forward direction. The weight displacement sensing unit 30 upon sensing weight displacement of a user in a backward direction causes the drive controller 20 to impart drive to the wheels such that the wheelchair 100 moves in a backward direction. The speed of the wheelchair 100 is governed by the rate of forward and backward displaced weight movement of the user in a particular direction. The weight displacement sensing unit 30 uses gyroscopes to sense the weight displacement of a user and includes a biasing system connectable to the tilt mechanism 40. The biasing system has springs located between the tilt mechanism 40 and the weight displacement sensing unit 30. If a user has limited upper body control, these springs provide resistance to return the user to a non tilt position.

The weight displacement sensing unit 30 is able to be activated between an off and on positions such that when in the off position the weight displacement sensing unit 30 is in a non operational state and when in an on position the weight displacement sensing unit 30 is an operational state to sense the weight displacement of a user to drive and steer the wheelchair 100.

The degree of turn of the wheelchair 100 is controlled by the degree of left and right movement of the user such that the greater extent of the left or right movement the tighter the left or right turn able to be achieved.

The seat 103 can be releasably mounted to the tilt mechanism 40 by a cam locking type arrangement so that the seat 103 is able to be removed when required such as to undertake maintenance or replace the seat with another.

The seat 103 has a seat portion, back portion, left side portion and right side portion. The seat and back portions can be separate from the left and right side portions so that the seat and back portion able to move independently relative to the left and side right portions. The left and right side portions can be able to be moved laterally so that the width between the left and side portions can be adjusted in order to accommodate different sized users. Also the left and right side portions are removable to allow users to be loaded on to and unloaded from the wheelchair 100. Alternatively, the left and right side portions are pivotally mounted to the seat such that they are able to be rotated upwardly and out of the way so that a user can be loaded on to and unloaded from the wheelchair 100. The seat 103 is preferably inclined in a forward direction.

The wheelchair 100 includes a dampener situated and connected to the tilt mechanism such that the dampener is adapted to control pendulum effects and oversteering effects upon using the wheelchair 100. The dampener is a hydraulic dampener and includes an adjustable valve 50 so that the dampening effect can be increased or decreased.

The wheelchair 100 can have foot stands that are able to be raised and lowered such that when in the lowered position the foot stands provide stability to the mobility device when stationary. The foot stands at the distal ends can include castor wheels.

The wheelchair 100 includes mudguards extending over and above the wheels 101. The rims of the wheels 101 can includes handgrips such that when desired a user can maneuver the mobility device by hand.

Turning to FIGS. 4 & 5 the mobility device shows details pertaining to the tilt mechanism having multiple pivots in order to control the movement and steering of the wheelchair 100. For illustrative purposes both FIGS. 4 & 5 show the seat 103 in various stages of forward (103F), upright (103U), backward (103B), right sideways (103R) and left sideways (103L) positions.

The wheelchair 100 consists of two spaced apart drive wheels 101, each mounted to a separate shaft 104 that is independent of the other drive wheel. A base 102 is pivotally situated on the shafts 104 which form the primary pivot P1 of the tilt mechanism. The seat 103 is connected to the base 102 about two further pivots, the secondary pivot P2 and tertiary pivot P3, by way of rods 105.

Secondary pivot P2 is situated above and adjacent the base 102 so as to pivotally connect respective ends of the rod 105 to the base 102 (as shown in FIG. 5). Both the primary and secondary pivots P1 & P2 allow the seat 103 to pivotally move in a forward and backward direction (103F, 103B) relative to the wheels 101 as to allow the wheel chair 100 move in a forward or backward direction. The secondary pivot P2 enhances the offset of weight transfer by a user so as to cause increased control of the back or forward tilt (103F, 103B) of the seat 103 relative to the shaft 104 which is not possible with just a primary pivot.

Tertiary pivot P3 is situated above the secondary pivot P2 and is situated below and adjacent the seat 103 so as to pivotally connect the respective ends of the rod 105 to the seat. Tertiary pivot P3 allows the tilt mechanism to tilt the seat 104 in left and right directions (103R, 103L) so as to allow the wheel chair to turn left or right. In order to enhance and control the movement of the seat 104 in the left and right directions, hydraulic rams 108 are connected between the seat and the base 102. The hydraulic rams are connected to hydraulic lines 109 that are in turn connected to a hydraulic flow valve so that the sideways, forward and backward movement can be controlled and regulated. The hydraulic system is connected to a line locker 111 which is able when activated to lock the hydraulic system such that the seat is unable to move in a sideways movement (103L, 103R). When in this locked movement the sideways movement of the wheel chair is operated by a joystick, preferably situated on and adjacent a side arm of the wheel chair 100.

The adjustable spring(s) 107 is a means of balancing and compensating for people of different weight. The adjustable spring(s) 107 is attached at one end to an upper region of the shaft/rod 105 and is attached at the other end to a fixed point/part 106 on the wheel chair 100.

The base 102 houses the drive control mechanism, the main components of the weight displacement sensing mechanism that is connectable to the tilt mechanism and the drive control mechanism such that upon sensing a weight displacement of a user in a particular direction the weight displacement sensor causes the drive control means to impart drive to the drive wheels via the shafts 104 to move the wheel chair in the direction of the sensed displaced weight of the user so that the wheel chair is able to be driven in a forward and backward direction and steered in a left or right direction. The greater the weight displacement sensed the faster the wheel chair moves, for example leaning forward slightly will cause the wheel chair to move slowly in a forward direction, however leaning far forward will cause the wheel chair to move at a faster speed.

Advantages of the present invention are as follows:
a) A mobility device that is able to be operated by the user only
b) A mobility device that is easily maneuverable
c) A mobility device with a secondary pivot so as to enhance the offset of weight transfer of a user so as to cause increased control of the back or forward tilt of the seat relative to the drive shaft
d) A mobility device that has dual steering functionality
e) A mobility device having variable locking functionality to vary and lock the seat from tilting
f) A mobility device having optional hands steering control
g) A mobility device having sway control
h) A mobility device that is able to be used "off road"

It will of course be realised that while the foregoing has been given by way of illustrative example of this invention, all such and other modifications and variations thereto as would be apparent to persons skilled in the art are deemed to fall within the broad scope and ambit of this invention as is herein described in the appended claims. While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A powered mobility device with tilt mechanism having multiple pivots, which is able to be driven and steered with or without the use of hands, the powered mobility device includes:
   i. at least two drive wheels where each drive wheel is mounted on a separate drive shaft such that the each drive wheel can be independently driven;

ii. a drive controller drivingly coupled to the shafts;

iii. a seat mounted on a tilt mechanism enabling the seat to tilt in a forward, backward, left and right direction as a result of displacing a weight in either of those directions; and iv. a weight displacement sensor connected to the tilt mechanism and the drive controller such that upon sensing the weight displacement in a particular direction the weight displacement sensor causes the drive controller to impart drive to one or both of the drive wheels to move the mobility device in the direction of the sensed displaced weight and enable the mobility device to be driven in a forward or backward direction and/or steered in a left or right direction; wherein the tilt mechanism includes a primary and a secondary pivot, where the primary pivot is mounted on the shafts to allow the tilt mechanism to tilt the seat in the backward or forward direction, and the secondary pivot is spaced a distance above the primary pivot so that the secondary pivot is situated between the seat and the shafts such that the secondary pivot allows the seat to tilt backward or forward about the secondary pivot to enhance an offset of weight transfer to allow increased control of the backwards or forwards tilt of the seat relative to the shafts.

2. The powered mobility device as claimed in claim 1, wherein the mobility device further includes a tilt locker adapted to lock the tilt mechanism to disable the seat from being tilted.

3. The powered mobility device as claimed in claim 1, wherein the mobility device is adapted to disengage left and right movement of the tilt mechanism to causes the weight displacement sensor to enable the drive controller to steer the mobility device in a desired direction.

4. The powered mobility device as claimed in claim 1, wherein the tilt mechanism has a tertiary pivot situated between the secondary pivot and the seat, the tertiary pivot enables the tilt mechanism to tilt the seat in the left or right direction to allow the mobility device to turn left or right.

5. The powered mobility device as claimed in claim 4, wherein the tertiary pivot is connected to the secondary pivot by at least one rod that extends upwardly from the secondary pivot towards the seat.

6. The powered mobility device as claimed in claim 1, wherein the primary pivot includes a base unit pivotally situated on the shafts, wherein the base unit houses the drive controller.

7. The powered mobility device as claimed in claim 6, wherein the secondary pivot is situated above and adjacent the base unit so as to pivotally connect a respective end of a rod to the base.

8. The powered mobility device as claimed in claim 1, wherein the tilt mechanism includes at least one adjustable spring to balance and compensate for people of different weights, the at least one adjustable spring is attached at one end to an upper point/part of the tilt mechanism and is attached at the other end to a fixed point/part on the powered mobility device.

9. The powered mobility device as claimed in claim 1, wherein includes a hydraulic system to control and regulate a movement of the seat, the hydraulic system includes at least one hydraulic ram, at least one hydraulic line, the at least one hydraulic ram is connected between the seat and the base unit.

10. The powered mobility device as claimed in claim 9, wherein a line locker is connected to the hydraulic system, and the line locker when activated locks the hydraulic system to disable the seat from moving sideways.

11. The powered mobility device as claimed in claim 1, wherein the mobility device has two wheels.

12. The powered mobility device as claimed in claim 1, wherein the weight displacement sensor upon sensing weight displacement in a forward direction causes the drive controller to impart drive to the wheels to move the mobility device in the forward direction.

13. The powered mobility device as claimed in claim 1, wherein the weight displacement sensor upon sensing weight displacement in a backward direction causes the drive controller to impart drive to the wheels to move the mobility device in the backward direction.

14. The powered mobility device as claimed in claim 1, wherein a speed of the mobility device is controlled by the forward or backward direction of the seat such that a greater rate of displaced weight in the forward or backward direction of the seat is sensed by the weight displacement sensor and causes the drive controller to increase a drive output to the wheels and thus increase the speed of the mobility device.

15. The powered mobility device as claimed in claim 1, wherein a degree of turn of the mobility device is controlled by a degree of left or right direction such that a greater an extend of the left or right direction sensed by the weight displacement sensor causes the drive controller to impart a tighter left or right turn of the mobility device.

* * * * *